UNITED STATES PATENT OFFICE.

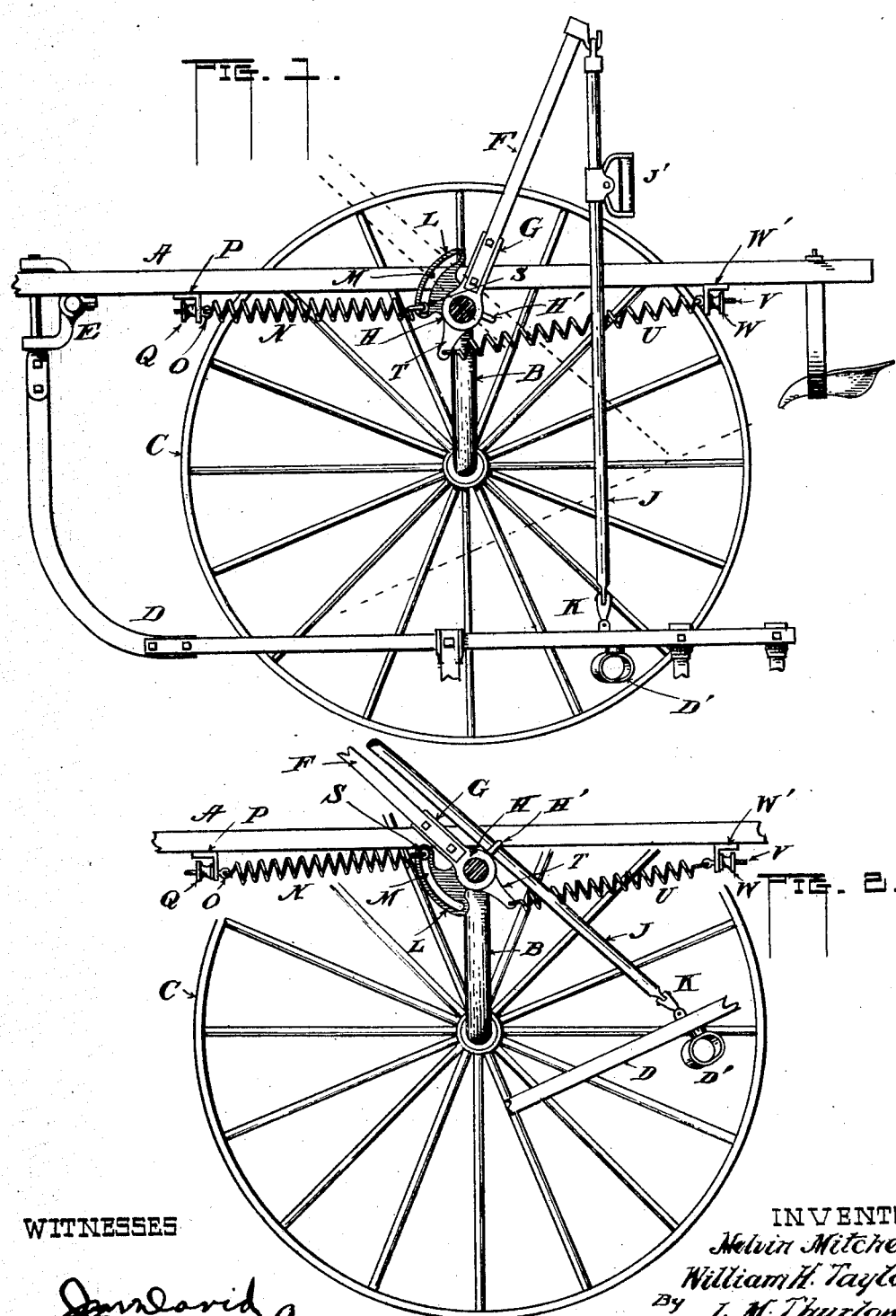

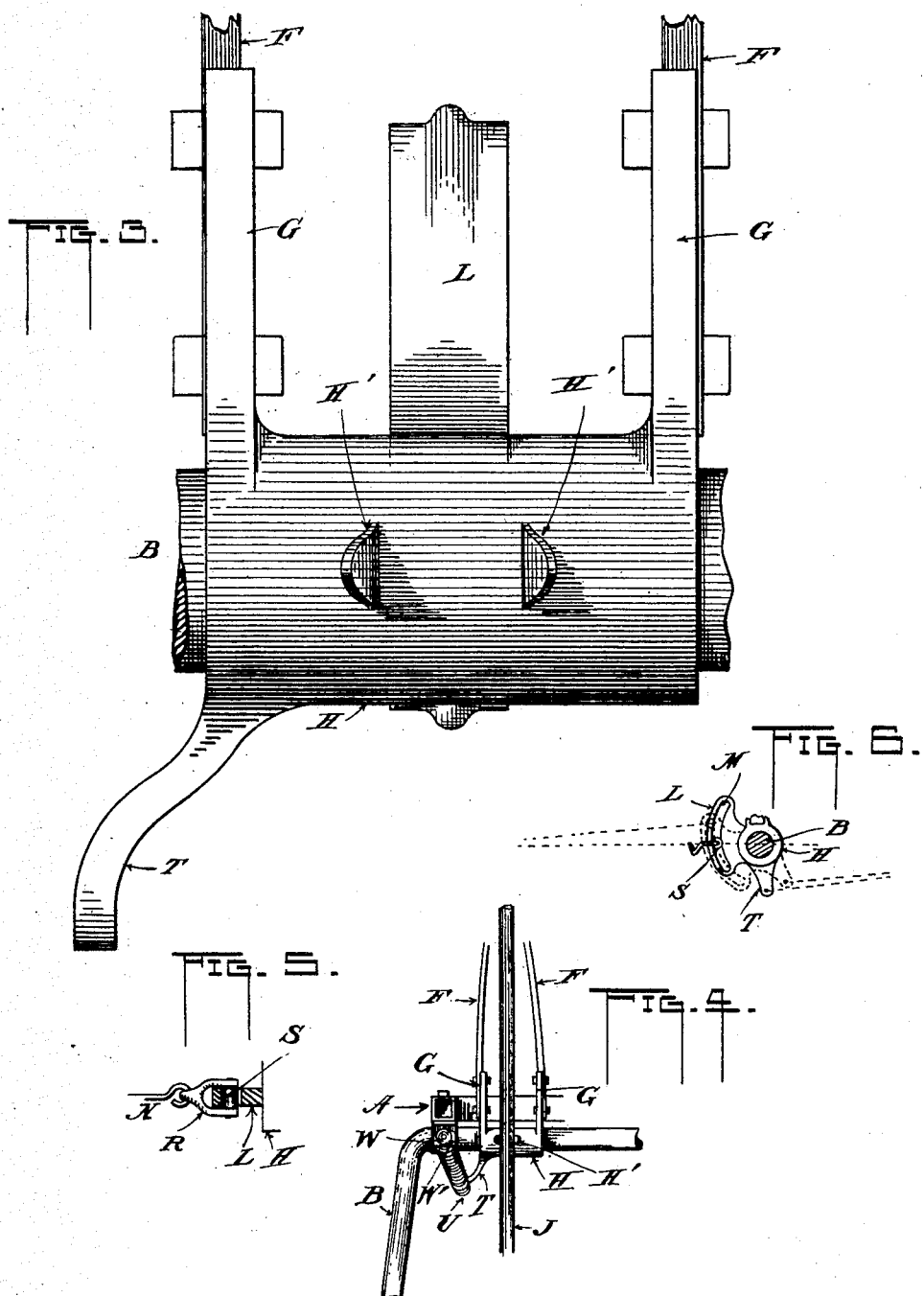

MELVIN MITCHELL AND WILLIAM H. TAYLOR, OF PEORIA, ILLINOIS, ASSIGNORS TO KINGMAN PLOW COMPANY, A CORPORATION OF ILLINOIS.

CULTIVATOR.

No. 860,311.  Specification of Letters Patent.  Patented July 16, 1907.

Application filed November 2, 1906. Serial No. 341,809.

*To all whom it may concern:*

Be it known that MELVIN MITCHELL and WILLIAM H. TAYLOR, citizens of the United States, residing at Peoria, in the county of Peoria and State of Illinois, have invented certain new and useful Improvements in Cultivators; and they do hereby declare that the following is a full, clear, and exact description of the invention, which will enable others skilled in the art to which it appertains to make and use the same.

This invention pertains to cultivators relating more particularly to that class known as riding cultivators.

The primary object of our invention is to construct a cultivator whose shovel-beams can be raised from the working position without the necessity of using the hands in so doing.

Another object is to construct a cultivator whose shovel-beams can be raised from the working position with a minimum of effort.

Another object is to provide peculiar means in a cultivator whereby the shovels will be maintained at their normal working position but can be raised to the inoperative position with a minimum of effort.

A further object is to provide peculiar means in a cultivator whereby while the shovels are free to "float" when at work yet they can be manually raised with a minimum of effort and then automatically reach and maintain an inoperative position.

Another object is to provide in connection with the shovel-beam of a cultivator, a pair of springs adapted to pull in opposite directions, by the aid of one of which, the shovel beam can be partially raised with a minimum of effort, the other spring remaining neutral the while, and then as the beam is raised still higher the neutral spring, being automatically brought into effective position, aids the other in raising the beam to the limit of its height or to its inoperative position by little or no effort on the part of the operator.

Another object is to provide in a cultivator means whereby the shovel-beam can be raised to an inoperative position by the feet of the operator and without the assistance of his hands.

My invention lies further in certain details of construction as will be described hereinafter and also form subject matter of appended claims.

In the drawing presented herewith—Figure 1 is a side elevation of a riding cultivator showing its shovel-beam in working position, and also showing my invention. Fig. 2 is a similar view showing the shovel-beam raised to its inoperative position and also showing my invention. Fig. 3 is a rear enlarged view of a member which forms part of my invention. Fig. 4 is a rear view of part of a cultivator showing my invention in part. Fig. 5 is a horizontal section of a portion of one of the members entering into my invention showing a friction-roller in connection therewith. Fig. 6 is a detail view of a portion of the invention.

In the figures A represents the main frame of a riding cultivator, B the arched axle which supports it and C one of the wheels. The shovel-beam is indicated by the letter D and has swiveled connection at E with the said frame A by any of the usual methods whereby said beam may be swung in any direction.

At F is a mast of any preferred construction which, however, in the drawing (see Fig. 4) is constructed of two members each of which is bolted or otherwise secured to an upwardly extending arm G formed with a sleeve H loosely carried on the axle. Hanging freely from the head of the mast F is a depending rod J having swiveled connection with the shovel-beam at K and having the usual handle J' as in common practice.

Thus far, as described, the cultivator is quite like those in common use. It is customary in all such implements to have supporting springs for the shovel-beam so as to make the work of the operator as easy as possible. It is also the practice to provide a spring or springs which are designed to assist the operator in raising the shovels when desired. The means for accomplishing these purposes have been many but the construction in all cases up to the present time has been such that the very things that were designed to assist the operator in raising the shovel-beam have been improperly applied resulting in still compelling the operator to use both hands and use all his strength in the effort to raise the shovel-beam. It is the purpose of the present invention, therefore, to produce mechanism that will support the shovel-beam but also permit it to be raised with practically no effort on the part of the user. The means employed in the present case consists of a pair of springs the successful use of which depends upon the proper disposal of their respective pulls, when under stress.

In the figures the sleeve H herein before referred to is provided with a forwardly extending member or arm L having a slot M preferably curved and with its hollow side toward the axle substantially as shown.

At N is a coil spring under continual tension one end having loosely attached thereto an eye-bolt O. At P is a bracket secured to the frame A and having the said eye-bolt extending therethrough the free end of the latter receiving a thumb-nut Q by the use of which the spring may be put under more or less tension. The opposite end of the spring has attached thereto a forked member R carrying a friction roller S, said roller being designed to travel within the slot M of the arm L. Carried by the sleeve H is a depending arm T to one end of which is connected a tension spring U, the opposite end of the latter having an eye-bolt V and thumb-nut W as herein described for the opposite spring N. A bracket W' is secured to the frame A through which the eye-bolt extends as also just above described.

In use the shovel-beam is suspended by means of the spring U the pull of which is transferred through the arm T and the mast F to the hanger J its tension being such that the beam is allowed a "floating" action, the operator being able to obtain greater or less depth of cut through the handles J' or, by means of his feet, through the stirrups at D' on the shovel-beam as is customary. The tendency of the spring N is to retract, and it will be noted that as positioned in Fig. 1, the slot M in which the roller S is positioned is above a horizontal line extending through the center of the axle B, and that the lower extremity of the slot is nearest the bracket P. The spring being attached to the said bracket and under constant tension its roller will naturally find a position nearest the said bracket which is at the bottom of the slot in line with the center of the axle where the pull of the spring will have no effect whatever upon the mast F, the spring U exerting the only effective pull. As the shovel-beam is raised and the mast F approaches a vertical position the slot in changing its location must travel about the axle and in so doing there is constantly a position in line with the center of the axle where the roller S will remain as shown in Fig. 6, the spring being thus kept where its tension is of no effect.

As the foregoing operation takes place the point of connection of the spring U with the arm T of the sleeve H reaches a position substantially at right angles to the line of its pull, and as the line of pull has now been transferred to a position farther away from the axle B about which the sleeve revolves the effective pull of the spring has become greater. This being true the weight of the shovel-beam and its parts is partially lifted by said spring U assisted by the foot of the operator positioned within the stirrup D'. In rising still higher the upper part of the slot M is carried in the direction of the bracket P as shown by broken lines in Fig. 6, and the result is to cause the roller to ascend into the top of the slot the line of pull of the spring being thereby carried above the axle where it immediately obtains a leverage through the arm L and sleeve H causing the mast to reach the position shown in Fig. 2, aided of course by the spring U, and the operators' foot, if desired, as intimated. The hanger J now lies parallel to the mast and both rest against the sleeve H in which position the said parts remain with the shovel beam raised to its fullest extent. It is now seen that the spring N has exerted a pull and is still under tension, while the spring U has lost the greater part of its pull though also still under tension, and both combined serve to hold the parts in the position shown, although either spring alone would serve to do so although either spring alone would so hold the parts. It is quite evident that if the slot M were described from the center of the axle the spring N would have no office since the slot would then be concentric with the axle and the line of pull would consequently remain as shown in Fig. 1 regardless of the position of the slot, but the point from which this slot is described is somewhat above the center of the axle so that in fact the upper part of the slot is farther away from the axle than its lower part, and when moved by the mast to the position shown in Fig. 2 the spring would still be inoperative. The slot, then, instead of being concentric with the axle is eccentric thereto. It is to be understood that the spring N must be inoperative during the time the shovels are at work in the ground thereby allowing the spring U to support the weight of the shovel-beam and its supporting members at the working position.

Riding on the seat the operator keeps his feet in the stirrups D', there being one for each beam of which there are two, and a very slight effort indeed is necessary to raise the beams to the inoperative position whereas heretofore the hands and feet were both necessary. With our device the driver uses his hands only for guiding the horses. Both springs at the proper time exert their pull in opposite directions to accomplish the final raising movement, and it will be seen that contrary to the action of springs in the older types of cultivators, the springs in my device do not pull upon one another, one of them being neutral until such a time as it is thrown automatically into operative position to assist the other. When the operator raises the beam he is assisted by the spring U until a point is reached where the spring N asserts itself at which time both said springs act together to complete the movement.

Evidently we do not wish to be confined to the exact structure herein described and shown since it is possible to employ other form of mechanism to accomplish the same purpose. In order to hold the shovel beams in fixed position when raised, we provide on the sleeve H the lugs or ears H' as shown in the figures between which the hanger J lies as in Fig. 4 this preventing all side swinging.

1. An axle, a frame supported on the axle, a cultivator-beam supported from the frame, a sleeve mounted on the axle and connected to the cultivator beam, a spring constantly tending to rotate the sleeve and lift the beam, a rigid arm projecting from the sleeve, a spring reaching upon the frame, normally pulling approximately in a radial direction upon said arm, and arranged to travel upon said arm away from the axis as the sleeve rotates substantially as set forth.

2. An axle, a frame supported on the axle, a cultivator-beam supported from the frame, a sleeve mounted on the axle and connected to the cultivator beam, a spring constantly tending to rotate the sleeve and lift the beam, a rigid arm projecting from the sleeve, a spring reaching upon the frame, normally pulling approximately in a radial direction upon said arm, and arranged to travel upon said arm away from the axis as the sleeve rotates thereby assisting the first said spring to raise the shovel-beam the latter through the spring being sustained in its raised position.

3. An axle, a frame supported on the axle, a cultivator beam supported from the frame, a member mounted to rock on the axle and connected with the cultivator-beam, a spring constantly tending to rotate the member and lift the beam, an arm projecting from and rigid with the member, a spring reacting upon the frame, normally pulling approximately in a radial direction upon said arm and arranged to travel upon said arm away from the axis as the member rotates substantially as described.

4. An axle, a frame supported thereon, a cultivator-beam pivotally supported from the frame, a member mounted to rock on the axle, and having connection with the cultivator-beam, a spring connected to the member and constantly tending to rotate the member and lift the beam, an arm projecting from the member substantially at right angles to the axis thereof, a spring reacting on the frame, normally pulling approximately in a radial direction upon the arm and arranged to travel upon said arm away from the axis as the member rotates substantially as described.

5. An axle, a frame supported thereon, a cultivator-beam pivotally supported from the frame, a member mounted to rock on the axle, and having connection with the cultivator-beam, a spring connected to the member and constantly tending to rotate the member and lift the beam, an arm projecting from the member substantially at right angles to the axis thereof, and a spring reacting upon the frame, normally pulling approximately in a radial direction upon the arm and arranged to travel upon the arm away from the axis as the member rotates, said arm arranged to retain the spring in operative connection therewith.

6. An axle, a frame supported thereon, a cultivator-beam pivotally supported from the frame, a member mounted to rock on the axle, and having connection with the cultivator-beam, a spring connected to the member and constantly tending to rotate the member and lift the beam, an arm projecting from the member substantially at right angles to the axis thereof, and having a slot arranged eccentrically to the axis of the member, a spring reacting on the frame, normally pulling approximately in a radial direction upon the arm and arranged to travel within the slot away from the axis as the member rotates.

7. An axle, a frame supported thereon, a cultivator-beam supported from the frame, a member mounted to rock on the axle, and having connection with the cultivator-beam, a spring connected at one end to the member below the axle and at its other end to the frame in the rear of the axle, and tending to rotate the member and lift the beam, a rigid arm projecting forward from the member, a spring connected forward of the axle and reacting upon the frame, normally pulling approximately in a radial direction upon said arm and arranged to travel upon said arm away from the axis as the member rotates substantially as described.

8. An axle, a frame supported thereon, a cultivator-beam supported from the frame, a mast mounted to rock on the axle and connected with the beam, a spring adjustably secured at one end to the implement frame, its other end supporting the weight of the shovel-beam through the mast, and a second spring having slidable connection relative to the mast and under continual tension, but ineffective when the beam is in its working position, and automatically shifting to a position of pull, when the mast is lifted, to assist the first spring in raising the beam to an inoperative position.

9. An axle, a frame supported thereon, a cultivator-beam supported from the frame, a mast mounted to rock on the axle and connected with the beam, a spring for suspending the beam at its working position through the mast, a member on the mast positioned eccentric to the axis thereof, and a spring slidably connected with the member and held at its other end, the same being under constant tension, its pull being effective, when the beam is at or near the working position, and adapted through the eccentric member to automatically change its position when the member is partially raised, to obtain an effective pull and assist the first spring and the operator to raise the beam.

10. In a cultivator, a frame, a cultivator-beam, a support, a member carried by and adapted to rock on the support and connected to and adapted for lifting the said beam, a spring constantly tending to rock the member and lift the beam, a spring reacting upon the frame and normally pulling upon the member approximately from the axis about which it rocks, and arranged to travel upon said member away from the axis substantially in the direction described.

11. An axle, a frame supported thereon, a cultivator-beam supported from the frame, a member mounted to rock on the axle and connected with the beam, a spring constantly tending to lift the beam and for suspending it at the working position through the member, a spring reacting upon the frame and normally pulling approximately in a radial direction upon the member there being means for causing the spring to travel upon the member away from the axis substantially as described.

In testimony whereof we affix our signatures, in presence of two witnesses.

MELVIN MITCHELL.
WILLIAM H. TAYLOR.

Witnesses:
A. W. GRAFTON,
F. J. STANGEL.